(12) United States Patent
Sakurai

(10) Patent No.: US 10,745,545 B2
(45) Date of Patent: Aug. 18, 2020

(54) TIRE AND METHOD OF MANUFACTURING RUBBER COMPOSITION

(71) Applicant: BRIDGESTONE CORPORATION, Tokyo (JP)

(72) Inventor: Hideyuki Sakurai, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/577,058

(22) PCT Filed: May 11, 2016

(86) PCT No.: PCT/JP2016/002309
§ 371 (c)(1),
(2) Date: Nov. 27, 2017

(87) PCT Pub. No.: WO2016/194309
PCT Pub. Date: Dec. 8, 2016

(65) Prior Publication Data
US 2018/0171116 A1  Jun. 21, 2018

(30) Foreign Application Priority Data
Jun. 3, 2015  (JP) .................................. 2015-113303

(51) Int. Cl.
| C08L 7/00 | (2006.01) |
| C08K 5/405 | (2006.01) |
| C08L 9/06 | (2006.01) |
| C08J 3/20 | (2006.01) |
| B60C 1/00 | (2006.01) |
| C08J 3/24 | (2006.01) |
| C08J 3/26 | (2006.01) |
| C08K 3/36 | (2006.01) |
| C08K 5/21 | (2006.01) |
| C08K 5/31 | (2006.01) |
| C08K 5/54 | (2006.01) |

(52) U.S. Cl.
CPC .............. *C08L 9/06* (2013.01); *B60C 1/0016* (2013.01); *C08J 3/20* (2013.01); *C08J 3/242* (2013.01); *C08J 3/26* (2013.01); *C08K 3/36* (2013.01); *C08K 5/21* (2013.01); *C08K 5/31* (2013.01); *C08K 5/405* (2013.01); *C08K 5/54* (2013.01); *C08L 7/00* (2013.01)

(58) Field of Classification Search
CPC .................... C08L 7/00; C08K 5/405
See application file for complete search history.

(56) References Cited

U.S. PATENT DOCUMENTS

| 2001/0034389 A1 | 10/2001 | Vasseur |
| 2011/0144236 A1 | 6/2011 | Mihara |
| 2013/0331480 A1 | 12/2013 | Suzuki et al. |
| 2014/0243448 A1 | 8/2014 | Lesage et al. |
| 2014/0329946 A1 | 11/2014 | Horie et al. |
| 2014/0350173 A1 | 11/2014 | Matsuo |
| 2014/0350174 A1 | 11/2014 | Yukimura et al. |

FOREIGN PATENT DOCUMENTS

| CN | 103391967 A | 11/2013 | |
| CN | 103987773 A | 8/2014 | |
| CN | 104011114 A | 8/2014 | |
| CN | 104024309 A | 9/2014 | |
| EP | 2 623 546 A1 | 8/2013 | |
| EP | 2799480 A1 | 11/2014 | |
| EP | 3064543 A1 | 9/2016 | |
| JP | 5-269884 A | 10/1993 | |
| JP | 2002-521516 A | 7/2002 | |
| JP | 2006-063093 A | 3/2006 | |
| JP | 2008-303330 A | 12/2008 | |
| JP | 2009-256540 A | 11/2009 | |
| JP | 2010-254740 A | 11/2010 | |
| JP | 2014-534283 A | 12/2014 | |
| WO | 2012/043853 A1 | 4/2012 | |
| WO | WO-2013045483 A1 * | 4/2013 | ........... B60C 1/0016 |

(Continued)

OTHER PUBLICATIONS

International Search Report for PCT/JP2016/002309, dated Jul. 29, 2016 (PCT/ISA/210).
Communication dated Apr. 11, 2018 from the European Patent Office in counterpart European application No. 16802752.2.
Database WPI: "Winter Size Passenger Car Comprise Tread Made Rubber Composition Contain Oil Extend Butadiene Isoprene Based Diene Silica Carbon Black Preset Amount", May 28, 2015, XP002779684, 3 pages.

(Continued)

*Primary Examiner* — Vickey Nerangis
(74) *Attorney, Agent, or Firm* — Sughrue Mion, PLLC

(57) ABSTRACT

This disclosure is to provide a method of manufacturing a rubber composition comprising kneading a rubber composition that includes 100 parts by mass (pbm) of a rubber component (A) including 50 mass % or more of natural rubber, 5-50 pbm of at least one kind of thermoplastic resin (B) selected from among C5-based resins, C5-C9-based resins, C9-based resins, terpene-based resins, terpene-aromatic compound-based resins, rosin-based resins, dicyclopentadiene resins, and alkylphenol-based resins; 20-120 pbm of a filler (C) including silica; at least one kind of vulcanization accelerator (D) selected from among guanidines, sulfenamides, thiazoles, thiourea and diethyl thiourea; a silane coupling agent (E); and a vulcanizing agent (F). The kneading comprises a kneading stage A for kneading components (A)-(C), part or all of component (D), and 2 pbm or more of component (E), and a kneading stage B for kneading component (F) with a kneaded product of the kneading stage A.

6 Claims, No Drawings

(56) References Cited

FOREIGN PATENT DOCUMENTS

WO     WO-2013099822 A1 *   7/2013
WO         2015076048 A1     5/2015

OTHER PUBLICATIONS

Search Report of the Office Action dated Oct. 8, 2019, issued by the China National Intellectual Property Administration in Chinese Application No. 201680030613.7.
Communication dated Jun. 18, 2020, issued by the State Intellectual Property Office of P.R. China in counterpart Chinese Application No. 201680030613.7.

* cited by examiner

TIRE AND METHOD OF MANUFACTURING RUBBER COMPOSITION

CROSS REFERENCE TO RELATED APPLICATIONS

This application is a National Stage of International Application No. PCT/JP2016/002309 filed May 11, 2016, claiming priority based on Japanese Patent Application No. 2015-113303, filed Jun. 3, 2015, the contents of all of which are incorporated herein by reference in their entirety.

TECHNICAL FIELD

This disclosure relates to a tire and a method of manufacturing a rubber composition.

BACKGROUND

In view of improving vehicle safety, various studies have been made to improve a tire's braking performance and driving performance not only on dry road surfaces but also on other surfaces such as wet road surfaces and icy and snowy road surfaces. For example, one known technique uses, as the tread rubber, a rubber composition prepared by compounding an aroma oil together with rubber components such as natural rubber (NR) and butadiene rubber (BR) to improve performance on wet road surfaces (Patent Literature (PTL) 1). To improve gripping performance on icy and snowy road surfaces and wet road surfaces, another known technique uses, as the tread rubber, a rubber composition obtained by compounding $C_5$-based resins at 5 parts by mass to 50 parts by mass per 100 parts by mass of a rubber component that includes 30 mass % or more in total of natural rubber and/or polyisoprene rubber (PTL 2).

To improve the performance on dry road surfaces and wet road surfaces, another known technique increases the friction coefficient of a tire by using, as the tread rubber, a rubber composition containing 8 parts by mass of resin or more per 100 parts by mass of a rubber component, such as natural rubber, and a filler including 80 mass % or more of a white filler (PTL 3). With these techniques, however, tires have high heat buildup, leading to the problem of reduced performance on ice.

CITATION LIST

Patent Literature

PTL 1: JP H5-269884 A
PTL 2: JP 2009-256540 A
PTL 3: JP 2006-63093 A

SUMMARY

Technical Problem

In light of these considerations, it would be helpful to provide a method of manufacturing a rubber composition to obtain a rubber composition that can endow a tire with a lower heat generating property and better ice and snow performance. It would also be helpful to provide a tire with a lower heat generating property and better ice and snow performance.

Solution to Problem

The disclosed method of manufacturing a rubber composition comprises kneading a rubber composition, wherein the rubber composition comprises a rubber component (A) including 50 mass % or more of natural rubber; at least one kind of thermoplastic resin (B) selected from the group consisting of $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, 5 parts by mass to 50 parts by mass of the at least one kind of thermoplastic resin (B) per 100 parts by mass of the rubber component being included; a filler (C) including silica, 20 parts by mass to 120 parts by mass of the filler (C) per 100 parts by mass of the rubber component being included; at least one kind of vulcanization accelerator (D) selected from the group consisting of guanidines, sulfenamides, thiazoles, thiourea and diethyl thiourea; a silane coupling agent (E); and a vulcanizing agent (F), and the kneading comprises: a kneading stage A for kneading the rubber component (A), the thermoplastic resin (B), the filler (C), part or all of the vulcanization accelerator (D), and 2 parts by mass or more of the silane coupling agent (E) per 100 parts by mass of the rubber component, and a kneading stage B, after the kneading stage A, for kneading the vulcanizing agent (F) with a kneaded product prepared by the kneading in the kneading stage A.

The method of manufacturing a rubber composition according to this disclosure can provide a rubber composition that can endow a tire with a lower heat generating property and better ice and snow performance.

The "$C_5$-based resins" disclosed herein refer to $C_5$-based synthetic petroleum resins, i.e. resins obtained by polymerizing a $C_5$ fraction using a Friedel-Crafts catalyst such as $AlCl_3$ or $BF_3$.

The "$C_5$- to $C_9$-based resins" disclosed herein refer to $C_5$- to $C_9$-based synthetic petroleum resins, i.e. resins obtained by polymerizing a $C_5$ to $C_{11}$ fraction using a Friedel-Crafts catalyst such as $AlCl_3$ or $BF_3$.

The "$C_9$-based resins" disclosed herein refer to $C_9$-based synthetic petroleum resins, i.e. resins obtained by polymerizing a $C_9$ fraction using a Friedel-Crafts catalyst such as $AlCl_3$ or $BF_3$.

In the disclosed method of manufacturing a rubber composition, 5 mass % or more to less than 50 mass % of styrene-butadiene copolymer rubber is preferably included in the rubber component (A).

According to this configuration, the glass transition temperature (Tg) is increased by compounding a certain amount of styrene-butadiene copolymer rubber in the rubber component, which leads to an improvement in braking performance and steering stability on dry road surfaces.

In the disclosed method of manufacturing a rubber composition, the content of the silica in the filler (C) is preferably 50 mass % to 100 mass %.

According to this configuration, increasing the content of silica allows the rubber to deform flexibly, thus allowing further improvement in the braking performance on slippery road surfaces.

In the disclosed method of manufacturing a rubber composition, the content of the silica in the filler (C) is preferably 90 mass % or more.

According to this configuration, increasing the content of silica allows the rubber to deform flexibly, thus allowing even further improvement in the braking performance on slippery road surfaces.

A tire according to this disclosure uses, in the tread rubber, the rubber composition obtained by the disclosed method of manufacturing a rubber composition.

The tire according to this disclosure has a lower heat generating property and better ice and snow performance.

Advantageous Effect

According to this disclosure, a method of manufacturing a rubber composition to obtain a rubber composition that can endow a tire with a lower heat generating property and better ice and snow performance can be provided. A tire with a lower heat generating property and better ice and snow performance can also be provided.

DETAILED DESCRIPTION

Embodiments for implementing this disclosure are described below.

(Method of Manufacturing Rubber Composition)

The disclosed method of manufacturing a rubber composition includes a step of kneading a rubber composition.

The rubber composition manufactured with the disclosed method of manufacturing a rubber composition includes at least a rubber component (A), a thermoplastic resin (B), a filler (C), a vulcanization accelerator (D), a silane coupling agent (E), and a vulcanizing agent (F) and includes other components as necessary.

<Kneading Step>

The kneading step at least includes a kneading stage A and a kneading stage B and as necessary includes another kneading stage C.

<<Kneading Stage A>>

In kneading stage A, a mixture containing the rubber component (A), the thermoplastic resin (B), the filler (C), part or all of the vulcanization accelerator (D), and 2 parts by mass or more of the silane coupling agent (E) per 100 parts by mass of the rubber component is kneaded. A kneaded product (preliminary composition) is prepared with this kneading.

The kneaded product (preliminary composition) prepared in kneading stage A does not include the vulcanizing agent (F).

During the kneading in kneading stage A, the maximum temperature of the mixture is preferably 120° C. to 190° C., more preferably 130° C. to 175° C., and particularly preferably 140° C. to 170° C. to better improve the activity of the coupling function of the silane coupling agent (E).

During kneading stage A, the rubber component (A), the thermoplastic resin (B), the filler (C), and the silane coupling agent (E) are preferably blended and kneaded, with the vulcanization accelerator (D) then being added and the mixture further kneaded.

<<Kneading Stage B>>

Kneading stage B is a stage, after kneading stage A, for kneading the vulcanizing agent (F) with the kneaded product (preliminary composition) prepared by kneading in kneading stage A. A rubber composition is prepared by this kneading.

In kneading stage B, the vulcanization accelerator (D) may be further added.

During the kneading in kneading stage B, the maximum temperature of the mixture is preferably 60° C. to 140° C., more preferably 80° C. to 120° C., and particularly preferably 100° C. to 120° C.

When (i) transitioning from kneading stage A to kneading stage B, or (ii) transitioning from the below-described other kneading stage C to kneading stage B in the case of performing the below-described other kneading stage C between kneading stage A and kneading stage B, the transition to kneading stage B preferably takes place after lowering the temperature of the kneaded product (preliminary composition) by 10° C. or more from the temperature immediately after completion of kneading in kneading stage A or the other kneading stage C.

<<Other Kneading Stage C>>

The disclosed method of manufacturing a rubber composition may, as necessary, include another kneading stage C between kneading stage A and kneading stage B. The other kneading stage C is a stage for further kneading the kneaded product (preliminary composition) prepared in kneading stage A. The other kneading stage C may be performed multiple times.

During the other kneading stage C, the vulcanizing agent (F) is not added.

During the kneading in the other kneading stage C, the maximum temperature of the mixture is preferably 120° C. to 190° C., more preferably 130° C. to 175° C., and particularly preferably 140° C. to 170° C. to better improve the activity of the coupling function of the silane coupling agent (E).

The kneading apparatus used for kneading in the kneading step is not limited and can be selected appropriately in accordance with purpose. Examples include a single-screw kneading extruder: a multi-screw kneading extruder (continuous kneading apparatus); a kneader with a mesh-type or non-mesh-type spinning rotor such as a Banbury mixer, an intermixer, or a kneader; and a roll (a batch-type kneading apparatus).

Conditions during the kneading, such as the rotational velocity of the rotor, the ram pressure, the kneading temperature, and the type of kneading apparatus can be selected appropriately.

<Rubber Composition>

The rubber composition manufactured by the disclosed method of manufacturing a rubber composition includes a rubber component (A) including 50 mass % or more of natural rubber; at least one kind of thermoplastic resin (B) selected from the group consisting of $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, 5 parts by mass to 50 parts by mass of the at least one kind of thermoplastic resin (B) per 100 parts by mass of the rubber component being included: a filler (C) including silica, 20 parts by mass to 120 parts by mass of the filler (C) per 100 parts by mass of the rubber component being included; at least one kind of vulcanization accelerator (D) selected from the group consisting of guanidines, sulfenamides, thiazoles, thiourea and diethyl thiourea; a silane coupling agent (E); and a vulcanizing agent (F).

<<Rubber Component (A)>>

The rubber component (A) included in the rubber composition includes at least natural rubber (NR) and includes other rubber material as necessary.

The compounding amount of natural rubber in the rubber component (A) may be any suitable amount that is 50 mass % or more and can be selected appropriately in accordance with purpose, but the compounding amount is preferably 70 mass % or more and more preferably 80 mass % or more. If the compounding amount of natural rubber is 50 mass % or more, a sufficient effect due to compounding the below-described $C_5$-based resins can more easily be achieved.

—Other Rubber Material—

The other rubber material is not limited and can be selected appropriately in accordance with purpose. Examples include styrene-butadiene copolymer rubber (SBR), butadiene rubber (BR), acrylonitrile-butadiene copolymer rubber, chloroprene rubber, and polyisoprene rubber. One type may be used alone, or a combination of two or more types may be used.

Among these other types of rubber, styrene-butadiene copolymer rubber is advantageous for allowing improvement in the braking performance and the steering stability on dry road surfaces.

The compounding amount of styrene-butadiene copolymer rubber is not limited and can be selected appropriately in accordance with purpose, but the compounding amount is preferably 5 mass % or more to less than 50 mass %, more preferably 10 mass % to 35 mass %, and particularly preferably 10 mass % to 20 mass % within the rubber component (A).

If the compounding amount of styrene-butadiene copolymer rubber is 5 mass % or more, the braking performance and steering stability on dry road surfaces can be improved. If the compounding amount of styrene-butadiene copolymer rubber is less than 50 mass %, a specified amount of the natural rubber in the rubber component (A) can be guaranteed, thereby making it easier to achieve the effect due to compounding the below-described $C_5$-type resins. Setting the compounding amount of styrene-butadiene copolymer rubber within the aforementioned more preferable range or particularly preferable range offers the advantage of further improving the braking performance and steering stability on dry road surfaces.

<<Thermoplastic Resin (B)>>

The thermoplastic resin (B) is at least one kind selected from the group consisting of $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins. By including a specified amount of the thermoplastic resin (B) in the rubber composition, the glass transition temperature (Tg) of the rubber increases, and the loss tangent (tan δ) at 0° C. improves, thereby mainly improving the performance of a tire on wet road surfaces. The thermoplastic resin (B) is also highly compatible with natural rubber. Accordingly, the disclosed method of manufacturing a rubber composition using natural rubber offers the advantage of increasing the compatibility of the thermoplastic resin (B).

The compounding amount of the thermoplastic resin (B) may be any suitable amount within 5 parts by mass to 50 parts by mass per 100 parts by mass of the rubber component (A) and can be selected appropriately in accordance with purpose, but the compounding amount is preferably 10 parts by mass to 30 parts by mass per 100 parts by mass of the rubber component (A).

If the compounding amount of the thermoplastic resin (B) is 5 parts by mass or more, the braking performance on icy and snowy roads can be sufficiently achieved, and if the compounding amount is 50 parts by mass or less, a low heat generating property is more easily achieved. Setting the compounding amount of the thermoplastic resin (B) within the aforementioned preferable range offers the advantage of obtaining wear resistance and fracture resistance.

—$C_5$-Based Resins—

The "$C_5$-based resins" refer to $C_5$-based synthetic petroleum resins, i.e. resins obtained by polymerizing a $C_5$ fraction using a Friedel-Crafts catalyst such as $AlCl_3$ or $BF_3$. Specific examples include a copolymer including, as main components, isoprene, cyclopentadiene, 1,3-pentadiene, and 1-pentene; a copolymer of 2-pentene and dicyclopentadiene; and a polymer mainly composed of 1,3-pentadiene.

Using a $C_5$-based resin as the thermoplastic resin (B) offers the advantage of also improving the wet gripping performance.

—$C_5$- to $C_9$-Based Resins—

The "$C_5$- to $C_9$-based resins" refer to $C_5$- to $C_9$-based synthetic petroleum resins, i.e. resins obtained by polymerizing a $C_5$ to $C_{11}$ fraction using a Friedel-Crafts catalyst such as $AlCl_3$ or $BF_3$. Specific examples include a copolymer mainly composed of styrene, vinyltoluene, α-methylstyrene, indene, or the like. Among these, a $C_5$- to $C_9$-based resin with little $C_9$ or higher component is preferable for having excellent compatibility with the rubber component (A). Specifically, in the $C_5$- to $C_9$-based resin, the proportion of the $C_9$ or higher component is preferably less than 50 mass % and more preferably 40 mass % or less.

Using a $C_5$- to $C_9$-based resin as the thermoplastic resin (B) offers the advantage of also improving the wet gripping performance.

—$C_9$-Based Resins—

The "$C_9$-based resins" refer to $C_9$-based synthetic petroleum resins, i.e. resins obtained by polymerizing a $C_9$ fraction using a Friedel-Crafts catalyst such as $AlCl_3$ or $BF_3$. Specific examples include a copolymer mainly composed of indene, methylindene, α-methylstyrene, vinyltoluene, or the like.

Using a $C_9$-based resin as the thermoplastic resin (B) offers the advantage of improving the wet gripping performance and the steering stability.

—Terpene-Based Resins—

The aforementioned terpene-based resin can be obtained by compounding turpentine, which is obtained simultaneously when obtaining rosin from pine trees, or a polymerizable component separated from the turpentine, and then polymerizing using a Friedel-Crafts catalyst. Specific examples include β-pinene resins and α-pinene resins.

Using a terpene-based resin as the thermoplastic resin (B) offers the advantage of improving the wet gripping performance and the steering stability.

—Terpene-Aromatic Compound-Based Resins—

The aforementioned terpene-aromatic compound-based resin can be obtained by reacting terpenes and various phenols using a Friedel-Crafts catalyst or by further condensing the resultant with formalin. Specific examples include terpene-phenol resins. A terpene-phenol resin with a phenol component of less than 50 mass % is preferable, and a terpene-phenol resin with a phenol component of 40 mass % or less is more preferable.

The terpenes used as raw material are not limited and can be selected appropriately in accordance with purpose. Examples include monoterpene hydrocarbons such as α-pinene and limonene. Among these, a terpene including α-pinene is preferable, and α-pinene itself is more preferable.

Using a terpene-aromatic compound-based resin as the thermoplastic resin (B) offers the advantage of improving the wet gripping performance and the steering stability.

—Rosin-Based Resins—

The aforementioned rosin-based resin is not limited and can be selected appropriately in accordance with purpose. Examples include natural resin rosins, such as gum rosin, tall oil resin, wood rosin, and the like included in raw pine rosin or tall oil; modified rosin; and a rosin derivative. Specific examples of the modified rosin derivative include a polymeric rosin and its partially hydrogenated rosin: a glycerin ester rosin and its partially hydrogenated rosin or completely hydrogenated rosin; and a pentaerythritol ester rosin and its partially hydrogenated rosin or completely hydrogenated rosin.

Using a rosin-based resin as the thermoplastic resin (B) offers the advantage of improving the wet gripping performance and the steering stability.

—Dicyclopentadiene Resin—

The aforementioned dicyclopentadiene resin can be obtained by polymerizing dicyclopentadiene with a Friedel-Crafts catalyst, such as $AlCl_3$ or $BF_3$, or the like. Specific examples of commercially-available dicyclopentadiene resins include Quinton 1920 (Nippon Zeon Co., Ltd.), Quinton 1105 (Nippon Zeon Co., Ltd.), and Marukarez M-890A (Maruzen Petrochemical Co., Ltd.).

Using a dicyclopentadiene resin as the thermoplastic resin (B) offers the advantage of further improving the braking performance on icy and snowy roads.

—Alkylphenol-Based Resins—

The aforementioned alkylphenol-based resin is not limited and can be selected appropriately in accordance with purpose. Examples include an alkylphenol-acetylene resin such as a p-tert-butylphenol-acetylene resin, an alkylphenol-formaldehyde resin having a low degree of polymerization, and the like.

Using an alkylphenol-based resin as the thermoplastic resin (B) offers the advantage of also improving the handling.

<<Filler (C)>>

The filler (C) includes at least silica and as necessary includes components such as carbon black, aluminum oxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate.

Including silica in the filler (C) provides the rubber composition with a sufficient reinforcing property and low heat generating property, without impairing the flexibility thereof, in a state where the natural rubber and the thermoplastic resin (B) are favorably dispersed.

The compounding amount of the filler (C) may be any suitable amount within 20 parts by mass to 120 parts by mass per 100 parts by mass of the rubber component (A) and can be selected appropriately in accordance with purpose, but the compounding amount is preferably 50 parts by mass to 100 parts by mass per 100 parts by mass of the rubber component (A).

If the compounding amount of the filler (C) is 20 parts by mass to 120 parts by mass, the reinforcing effect can be achieved without detracting from characteristics such as the flexibility of the rubber component. Setting the compounding amount of the filler (C) within the aforementioned preferable range offers the advantage of reducing the rolling resistance and improving the braking performance on wet road surfaces while also tending not to impair the flexibility of the rubber component.

—Silica—

The silica included in the filler (C) is not limited and can be selected appropriately in accordance with purpose. Examples include wet silica (hydrous silicate), dry silica (anhydrous silicate), calcium silicate, aluminum silicate, and the like. These types of silica may be used alone or in combination of two or more thereof. Among these, wet silica offers the advantage of improving the wet gripping performance.

The compounding amount of the silica is not limited and can be selected appropriately in accordance with purpose, but the compounding amount is preferably 50 mass % to 100 mass % within the filler (C), more preferably 80 mass % to 100 mass %, and particularly preferably 90 mass % to 100 mass %.

—Wet Silica—

The type of wet silica is not limited and can be selected appropriately in accordance with purpose.

While the wet silica is not limited and can be selected appropriately in accordance with purpose, the BET specific surface area thereof is preferably 40 $m^2/g$ to 350 $m^2/g$ and more preferably 80 $m^2/g$ to 300 $m^2/g$.

Setting the BET specific surface area of the wet silica within the aforementioned preferable range or more preferable range offers the advantage of making a reinforcing property compatible with dispersiveness into the rubber component.

Specific examples of commercially-available wet silica include the products "Nipsil AQ" and "Nipsil KQ" produced by Tosoh Silica Corporation and the product "ULTRASIL VN3" produced by Degussa.

<<Vulcanization Accelerator (D)>>

The vulcanization accelerator (D) is at least one selected from the group consisting of guanidines, sulfenamides, thiazoles, thiourea, and diethyl thiourea.

The compounding amount of the vulcanization accelerator (D) is not limited and can be selected appropriately in accordance with purpose, but the compounding amount is preferably 0.1 parts by mass to 20 parts by mass per 100 parts by mass of the rubber component (A).

If the compounding amount of the vulcanization accelerator (D) is less than 0.1 parts by mass, vulcanization is insufficient, whereas upon exceeding 20 parts by mass, vulcanization becomes excessive.

—Guanidines—

Using guanidines as the vulcanization accelerator (D) offers the advantage of increasing the activity of the below-described silane coupling agent (E).

The guanidines are not limited and can be selected appropriately in accordance with purpose. Examples include 1,3-diphenyl guanidine, 1,3-di-o-tolyl guanidine, 1-o-tolyl biguanide, a di-o-tolyl guanidine salt of dicatechol borate, 1,3-di-o-cumenyl guanidine, 1,3-di-o-biphenyl guanidine, and 1,3-di-o-cumenyl-2-propionyl guanidine. These guanidines may be used alone or in combination of two or more kinds thereof.

Among these guanidines, 1,3-diphenyl guanidine, 1,3-di-o-tolyl guanidine, and 1-o-tolyl biguanide are preferable for having high reactivity, with 1,3-diphenyl guanidine being more preferable.

—Sulfenamides—

Using sulfenamides as the vulcanization accelerator (D) offers the advantage of increasing the activity of the below-described silane coupling agent (E).

The sulfenamides are not limited and can be selected appropriately in accordance with purpose. Examples include N-cyclohexyl-2-benzothiazolyl sulfenamide, N,N-dicyclohexyl-2-benzothiazolyl sulfenamide, N-tert-butyl-2-benzothiazolyl sulfenamide, N-oxydiethylene-2-benzothiazolyl sulfenamide, N-methyl-2-benzothiazolyl sulfenamide, N-ethyl-2-benzothiazolyl sulfenamide, N-propyl-2-benzothiazolyl sulfenamide, N-butyl-2-benzothiazolyl sulfenamide, N-pentyl-2-benzothiazolyl sulfenamide, N-hexyl-2-benzothiazolyl sulfenamide, N-octyl-2-benzothiazolyl sulfenamide, N-2-ethylhexyl-2-benzothiazolyl sulfenamide, N-decyl-2-benzothiazolyl sulfenamide, N-dodecyl-2-benzothiazolyl sulfenamide, N-stearyl-2-benzothiazolyl sulfenamide, N,N-dimethyl-2-benzothiazolyl sulfenamide, N,N-diethyl-2-benzothiazolyl sulfenamide, N,N-dipropyl-2- benzothiazolyl sulfenamide, N,N-dibutyl-2-benzothiazolyl sulfenamide, N,N-dipentyl-2-benzothiazolyl sulfenamide, N,N-dihexyl-2-benzothiazolyl sulfenamide, N,N-dioctyl-2-benzothiazolyl sulfenamide, N,N-di-2-ethylhexylbenzothiazolyl sulfenamide, N,N-didodecyl-2-benzothiazolyl sulfenamide, and N,N-distearyl-2-benzothiazolyl sulfenamide. These sulfenamides may be used alone or in combination of two or more kinds thereof.

Among these sulfenamides, N-cyclohexyl-2-benzothiazolyl sulfenamide and N-tert-butyl-2-benzothiazolyl sulfenamide are preferable for having high reactivity.

—Thiazoles—

Using thiazoles as the vulcanization accelerator (D) offers the advantage of increasing the activity of the below-described silane coupling agent (E).

The thiazoles are not particularly limited and can be selected appropriately in accordance with purpose. Examples include 2-mercaptobenzothiazole, di-2-benzothiazolyl disulfide, a zinc salt of 2-mercaptobenzothiazole, a cyclohexylamine salt of 2-mercaptobenzothiazole, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium salt, 2-mercapto-6-nitrobenzothiazole, 2-mercapto-naphtho[1,2-d]thiazole, 2-mercapto-5-methoxybenzothiazole, and 6-amino-2-mercaptobenzothiazole. These thiazoles may be used alone or in combination of two or more kinds thereof.

Among these thiazoles, 2-mercaptobenzothiazole and di-2-benzothiazolyl disulfide are preferable for having high reactivity.

—Thiourea—

The aforementioned thiourea is a compound represented as $NH_2CSNH_2$.

Using thiourea as the vulcanization accelerator (D) offers the advantage of increasing the dispersiveness of the filler (C).

—Diethyl Thiourea—

The aforementioned diethyl thiourea is a compound represented as $C_2H_5NHCSNHC_2H_5$.

Using diethyl thiourea as the vulcanization accelerator (D) offers the advantage of increasing the dispersiveness of the filler (C).

<<Silane Coupling Agent (E)>>

The silane coupling agent (E) is not limited and can be selected appropriately in accordance with purpose. Examples include compounds represented by formula (I) below and compounds represented by formula (II) below. These compounds may be used alone or in combination of two or more kinds thereof.

Using the silane coupling agent (E) achieves even better operability during rubber working and achieves a pneumatic tire with better wear resistance.

$$(R^1O)_{3-p}(R^2)_pSi-R^3-S_a-R^3-Si(OR^1)_{3-r}(R^2)_r \quad (I)$$

[In the formula, when there are multiple $R^1$s, the $R^1$s may be the same or different, and each $R^1$ represents a linear, cyclic or branched alkyl group having 1 to 8 carbon atoms, a linear or branched alkoxyalkyl group having 2 to 8 carbon atoms, or a hydrogen atom. When there are multiple $R^2$s, the $R^2$s may be the same or different, and each $R^2$ represents a linear, cyclic or branched alkyl group having 1 to 8 carbon atoms. When there are multiple $R^3$s, the $R^3$s may be the same or different, and each $R^3$ represents a linear or branched alkylene group having 1 to 8 carbon atoms. Furthermore, a has an average value of 2 to 6, and p and r may be the same or different and each have an average value of 0 to 3. However, p and r cannot both be 3.]

$$(R^4O)_{3-s}(R^5)_sSi-R^6-S_k-R^7-S_k-R^6-Si(OR^4)_{3-t}(R^5)_t \quad (II)$$

[In the formula, when there are multiple $R^4$s, the $R^4$s may be the same or different, and each $R^4$ represents a linear, cyclic or branched alkyl group having 1 to 8 carbon atoms, a linear or branched alkoxyalkyl group having 2 to 8 carbon atoms, or a hydrogen atom. When there are multiple $R^5$s, the $R^5$s may be the same or different, and each $R^5$ represents a linear, cyclic or branched alkyl group having 1 to 8 carbon atoms. When there are multiple $R^6$s, the $R^6$s may be the same or different, and each $R^6$ represents a linear or branched alkylene group having 1 to 8 carbon atoms. $R^7$ is a divalent group represented by any one of the general formulas ($-S-R^8-S-$), ($-R^9-S_{m1}-R^{10}-$), and ($-R^{11}-S_{m2}-R^{12}-S_{m3}-R^{13}-$) ($R^8$ to $R^{13}$ are each a divalent hydrocarbon group having 1 to 20 carbon atoms, a divalent aromatic group, or a divalent organic group containing a heteroelement other than sulfur and oxygen; m1, m2, and m3 may be the same or different and each have an average value equal to or greater than 1 and less than 4), the multiple k's may be the same or different and each have an average value of 1 to 6, and s and t each have an average value of 0 to 3. However, s and t cannot both be 3.]

Specific examples of the silane coupling agent (E) represented by formula (I) above are not limited and can be selected appropriately in accordance with purpose. Examples include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, and bis(2-monoethoxydimethylsilylethyl)disulfide.

Specific examples of the silane coupling agent (E) represented by formula (II) are not limited and can be selected appropriately in accordance with purpose. Examples include the following.

average composition formula $$(CH_3CH_2O)_3Si-(CH_2)_3-S_2-(CH_2)_6-S_2-(CH_2)_3-Si(OCH_2CH_3)_3,$$

average composition formula $$(CH_3CH_2O)_3Si-(CH_2)_3-S_2-(CH_2)_{10}-S_2-(CH_2)_3-Si(OCH_2CH_3)_3,$$

average composition formula $$(CH_3CH_2O)_3Si-(CH_2)_3-S_3-(CH_2)_6-S_3-(CH_2)_3-Si(OCH_2CH)_3.$$

average composition formula

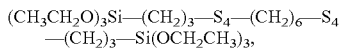
$(CH_3CH_2O)_3Si—(CH_2)_3—S_4—(CH_2)_6—S_4—(CH_2)_3—Si(OCH_2CH_3)_3$, average composition formula

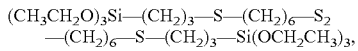
$(CH_3CH_2O)_3Si—(CH_2)_3—S—(CH_2)_6—S_2—(CH_2)_6—S—(CH_2)_3—Si(OCH_2CH_3)_3$, average composition formula

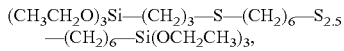
$(CH_3CH_2O)_3Si—(CH_2)_3—S—(CH_2)_6—S_{2.5}—(CH_2)_6—Si(OCH_2CH_3)_3$, average composition formula

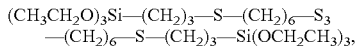
$(CH_3CH_2O)_3Si—(CH_2)_3—S—(CH_2)_6—S_3—(CH_2)_6—S—(CH_2)_3—Si(OCH_2CH_3)_3$, average composition formula

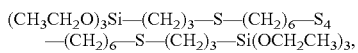
$(CH_3CH_2O)_3Si—(CH_2)_3—S—(CH_2)_6—S_4—(CH_2)_6—S—(CH_2)_3—Si(OCH_2CH_3)_3$, average composition formula

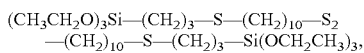
$(CH_3CH_2O)_3Si—(CH_2)_3—S—(CH_2)_{10}—S_2—(CH_2)_{10}—S—(CH_2)_3—Si(OCH_2CH_3)_3$, average composition formula

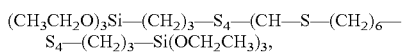
$(CH_3CH_2O)_3Si—(CH_2)_3—S_4—(CH—S—(CH_2)_6—S_4—(CH_2)_3—Si(OCH_2CH_3)_3$, average composition formula

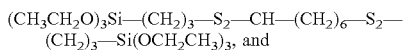
$(CH_3CH_2O)_3Si—(CH_2)_3—S_2—CH—(CH_2)_6—S_2—(CH_2)_3—Si(OCH_2CH_3)_3$, and average composition formula

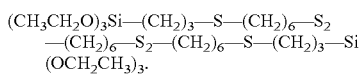
$(CH_3CH_2O)_3Si—(CH_2)_3—S—(CH_2)_6—S_2—(CH_2)_6—S_2—(CH_2)_6—S—(CH_2)_3—Si(OCH_2CH_3)_3$.

The compounding amount of the silane coupling agent (E) may be any suitable amount that is 2 parts by mass or more per 100 parts by mass of the rubber component (A) and can be selected appropriately in accordance with purpose, but the compounding amount is preferably 2 parts by mass to 20 parts by mass per 100 parts by mass of the rubber component (A) and more preferably 4 parts by mass to 12 parts by mass.

Setting the compounding amount of the silane coupling agent (E) within the aforementioned preferable range or more preferable range offers the advantage of improving reactivity with silica.

The ratio of the compounding amount (mass) of the silane coupling agent (E) to the compounding amount (mass) of the filler (C) (compounding amount of silane coupling agent (E)/compounding amount of filler (C)) is not limited and can be selected appropriately in accordance with purpose, but this ratio is preferably 0.01 to 0.20, more preferably 0.03 to 0.20, and particularly preferably 0.04 to 0.10.

Setting this ratio (compounding amount of silane coupling agent (E)/compounding amount of filler (C)) to 0.01 or higher makes it easier to achieve the effect of reducing the heat buildup of the rubber composition, and setting this ratio to 0.20 or lower can reduce the manufacturing costs of the rubber composition and can improve economic efficiency.

<<Vulcanizing Agent (F)>>

The vulcanizing agent (F) is not limited and can be selected appropriately in accordance with purpose. Examples include sulfur.

The compounding amount of the vulcanizing agent (F) is not limited and can be selected appropriately in accordance with purpose, but the compounding amount is preferably 0.1 parts by mass to 2.0 parts by mass, more preferably 1.0 parts by mass to 2.0 parts by mass, and particularly preferably 1.2 parts by mass to 1.8 parts by mass per 100 parts by mass of the rubber component (A).

<<Other Components>>

In addition to the above-described rubber component (A), thermoplastic resin (B), filler (C), vulcanization accelerator (D), silane coupling agent (E), and vulcanizing agent (F), compounding agents typically used in the rubber industry may be included as other components in the rubber composition obtained with the disclosed method of manufacturing a rubber composition. For example, an antioxidant, a vulcanization accelerator, an organic acid compound, and the like may be appropriately selected in a range that does not impede the object of this disclosure and compounded in an amount within a typical range. Commercially-available agents may suitably be used as the compounding agents.

(Tire)

A tire according to this disclosure uses, in the tread rubber, the rubber composition obtained by the disclosed method of manufacturing a rubber composition. The above-described rubber composition is used as the tread rubber to form a raw tire, and the raw tire can be vulcanized with a typical method to manufacture the tire of this disclosure. The above-described rubber composition is used in the tread rubber of the tire of this disclosure, and therefore the low heat generating property and ice and snow performance of the tire according to this disclosure are particularly good. The tire of this disclosure may be filled with ordinary air or air adjusted in partial pressure of oxygen and may also be filled with an inert gas such as nitrogen, argon, or helium.

EXAMPLES

This disclosure is described in more detail below with reference to Examples, by which this disclosure is not intended to be limited in any way.

Examples 1 to 17, Comparative Examples 1 to 4

Rubber compositions were prepared with the formulations and kneading methods indicated in Table 1 and Table 2. The rubber compositions were all prepared with the maximum temperature of the mixture in the first kneading stage (kneading stage A) being 150° C. Kneading stage B was performed after kneading stage A. Kneading was performed using a Banbury mixer.

<Performance Assessment>

(1) Test of Low Heat Generating Property (60° C. tan δ Index)

The low heat generating property (60° C. tan δ index) of the resulting rubber compositions was evaluated by the following method.

For the vulcanized rubber obtained by vulcanizing the rubber compositions for 33 minutes at 145° C., the 60° C. tan δ index was measured under the conditions of an initial load of 160 mg, dynamic strain of 1%, and a frequency of 52 Hz using a spectrometer produced by Ueshima Seisakusho Co., Ltd. The measurement results for Examples 1 to 17 and Comparative Examples 2 to 4 are listed in Tables 1 and 2, in which the measurement result for Comparative Example 1 is set to 100 as an index for comparative evaluation. Larger index values indicate a lower heat generating property.

(2) Test of Running Performance on Icy and Snow Roads (Ice and Snow Performance)

Tires of size (195/65R15) were produced using the resulting rubber compositions as tread rubber for the tires.

The produced tires were then mounted onto an applicable rim stipulated by JATMA standards to produce pneumatic tires with prescribed internal pressure. These tires were then mounted on a Crown Royal Saloon, the braking distance on snow from a speed of 40 km/h was measured five times, and the average distance was calculated. The evaluation results for Examples 1 to 17 and Comparative Examples 2 to 4 are listed in Tables 1 and 2, in which the evaluation result for Comparative Example 1 is set to 100 as an index for comparative evaluation. A higher index indicates better ice and snow performance for the tire.

TABLE 1

| | | | Comparative Example 1 | Comparative Example 2 | Comparative Example 3 | Comparative Example 4 | Example 1 | Example 2 | Example 3 | Example 4 | Example 5 | Example 6 |
|---|---|---|---|---|---|---|---|---|---|---|---|---|
| kneading stage A | rubber component | NR *1 | 100 | 100 | 100 | 100 | 100 | 100 | 100 | 100 | 100 | 100 |
| | | BR *2 | | | | | | | | | | |
| | | SBR *3 | | | | | | | | | | |
| | filler | silica *4 | 55 | 55 | 55 | 55 | 55 | 55 | 55 | 55 | 55 | 55 |
| | | CB *5 | 10 | 10 | 10 | 10 | 10 | 10 | 10 | 10 | 10 | 10 |
| | silane coupling agent | silane coupling agent *6 | 5 | 5 | 5 | 5 | 5 | 5 | 5 | 5 | 5 | 5 |
| | thermoplastic resin | C5 *7 | | | | | | | | 15 | | |
| | | C9 *8 | | 15 | | | 15 | 15 | | | | |
| | | C5-C9 *9 | | | | | | | | | 15 | |
| | | DCPD *10 | | | | | | | | | 15 | |
| | | rosin *11 | | | | | | | | | | 15 |
| | | alkylphenol *12 | | | | | | | | | | |
| | | terpene-phenol *13 | | | | | | | | | | |
| | vulcanization accelerator | DPG *14 | | | 0.6 | | 0.6 | | | | | |
| | | sulfenamide *15 | | | | | | | | | | |
| | | thiazole *16 | | | | | | | | | | |
| | | thiourea | | | | 0.6 | | 0.6 | 0.6 | 0.6 | 0.6 | 0.6 |
| | | diethyl thiourea | | | | | | | | | | |
| kneading stage B | vulcanization accelerator | DPG *14 | 1.6 | 1.6 | 1.0 | 1.6 | 1.0 | 1.6 | 1.6 | 1.6 | 1.6 | 1.6 |
| | | sulfenamide *15 | 0.6 | 0.6 | 0.6 | 0.6 | 0.6 | 0.6 | 0.6 | 0.6 | 0.6 | 0.6 |
| | | thiazole *16 | 1.0 | 1.0 | 1.0 | 1.0 | 1.0 | 1.0 | 1.0 | 1.0 | 1.0 | 1.0 |
| | | thiourea diethyl thiourea | | | | | | | | | | |
| | vulcanizing agent | sulfur | 1.5 | 1.5 | 1.5 | 1.5 | 1.5 | 1.5 | 1.5 | 1.5 | 1.5 | 1.5 |
| performance assessment | | 60° C. tanδ index | 100 | 97 | 101 | 103 | 103 | 105 | 106 | 106 | 104 | 104 |
| | | ice and snow performance index | 100 | 102 | 101 | 102 | 107 | 106 | 110 | 110 | 108 | 107 |

TABLE 2

| | | | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|
| kneading stage A | rubber component | NR *1 | 100 | 100 | 100 | 100 | 100 | 90 | 80 | 70 | 80 | 100 | 100 |
| | | BR *2 | | | | | | 10 | 20 | 30 | 10 | | |
| | | SBR *3 | | | | | | | | | 10 | | |
| | filler | silica *4 | 55 | 55 | 55 | 55 | 55 | 55 | 55 | 55 | 55 | 55 | 55 |
| | | CB *5 | 10 | 10 | 10 | 10 | 10 | 10 | 10 | 10 | 10 | 10 | 10 |
| | silane coupling agent | silane coupling agent *6 | 5 | 5 | 5 | 5 | 5 | 5 | 5 | 5 | 5 | 5 | 5 |
| | thermoplastic resin | C5 *7 | | | | | | | | | | 10 | 30 |
| | | C9 *8 | | | | | | | | | 15 | | |
| | | C5-C9 *9 | | | | 15 | | | | | | | |
| | | DCPD *10 | | | | | 15 | | | | | | |
| | | rosin *11 | | | | 15 | | | | | | | |
| | | alkylphenol *12 | 15 | | | | | 15 | 15 | 15 | | | |
| | | terpene-phenol *13 | | 15 | | | | | | | | | |
| | vulcanization accelerator | DPG *14 | | | | | | | | | | | |
| | | sulfenamide *15 | | | | 0.6 | | | | | | | |
| | | thiazole *16 | | | | | 0.6 | | | | | | |
| | | thiourea | 0.6 | 0.6 | | | | 0.6 | 0.6 | 0.6 | 0.6 | 0.6 | 0.6 |
| | | diethyl thiourea | | | 0.6 | | | | | | | | |

TABLE 2-continued

|  |  |  | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|
| kneading stage B | vulcanization accelerator | DPG *14 | 1.6 | 1.6 | 1.6 | 1.6 | 1.6 | 1.6 | 1.6 | 1.6 | 1.6 | 1.6 | 1.6 |
|  |  | sulfenamide *15 | 0.6 | 0.6 | 0.6 | 0 | 0.6 | 0.6 | 0.6 | 0.6 | 0.6 | 0.6 | 0.6 |
|  |  | thiazole *16 thiourea diethyl thiourea | 1.0 | 1.0 | 1.0 | 1.0 | 0.4 | 1.0 | 1.0 | 1.0 | 1.0 | 1.0 | 1.0 |
|  | vulcanizing agent | sulfur | 1.5 | 1.5 | 1.5 | 1.5 | 1.5 | 1.5 | 1.5 | 1.5 | 1.5 | 1.5 | 1.5 |
| performance assessment |  | 60° C. tanδ index | 104 | 104 | 103 | 105 | 104 | 107 | 108 | 106 | 105 | 105 | 108 |
|  |  | ice and snow performance index | 108 | 107 | 107 | 106 | 108 | 111 | 112 | 113 | 108 | 111 | 108 |

The tires of Examples 1 to 17, in which a vulcanization accelerator and a thermoplastic resin were compounded in the kneading stage A, exhibited a lower heat generating property and better ice and snow performance than the tires of Comparative Examples 1 to 4, in which a vulcanization accelerator and/or a thermoplastic resin were not compounded in kneading stage A.

*1: NR: natural rubber RSS #3
*2: BR: butadiene rubber (JSR Corporation, product name: BR01)
*3: SBR: styrene-butadiene copolymer rubber (JSR Corporation, product name: #1500)
*4: silica: silica (BET specific surface area of 205 m²/g) (Tosoh Silica Corporation, product name: Nipsil AQ)
*5: CB: carbon black (N220 (ISAF)) (Asahi Carbon Co., Ltd., product name: #80)
*6: silane coupling agent: bis(3-triethoxysilylpropyl)disulfide (average sulfur chain length: 2.35) (Evonik, product name: Si75 (Si75 is a registered trademark in Japan, other countries, or both))
*7: C5: $C_5$-based resin (ExxonMobil Chemical Company, product name: ECR1102)
*8: C9: $C_9$-based resin (Nippon Petrochemicals Co., Ltd., product name: Neopolymer 140)
*9: C5-C9: $C_5$- to $C_9$-based resin (ExxonMobil Chemical Company, product name: ECR213)
*10: DCPD: dicyclopentadiene resin (Nippon Zeon Co., Ltd., product name: Quinton 1105)
*11: rosin: rosin-based resin (Taishamatsu Essential Oil Co., Ltd., product name: Hairojin S)
*12: alkylphenol: alkylphenol-based resin (SI GROUP, product name: R7510PJ)
*13: terpene-phenol: terpene-aromatic compound-based resin (Yasuhara Chemical Co., Ltd., product name: YS Polystar T100)
*14: DPG: 1,3-diphenyl guanidine (Sanshin Chemical Industry Co., Ltd., product name: Sanceler D)
*15: sulfenamide: N-tert-butyl-2-benzothiazolyl sulfenamide (Sanshin Chemical Industry Co., Ltd., product name: Sanceler NS)
*16: thiazole: di-2-benzothiazolyl disulfide (Sanshin Chemical Industry Co., Ltd., product name: Sanceler DM)

INDUSTRIAL APPLICABILITY

According to this disclosure, a method of manufacturing a rubber composition to obtain a rubber composition that can endow a tire with a lower heat generating property and better ice and snow performance can be provided, and a tire with a lower heat generating property and better ice and snow performance can also be provided.

The invention claimed is:

1. A method of manufacturing a rubber composition, the method comprising kneading a rubber composition, wherein the rubber composition comprises a rubber component (A) including 50 mass % or more of natural rubber; at least one kind of thermoplastic resin (B) selected from the group consisting of terpene-based resins, terpene-aromatic compound-based resins, rosin-based resins, dicyclopentadiene resins, and alkylphenol-based resins, 5 parts by mass to 50 parts by mass of the at least one kind of thermoplastic resin (B) per 100 parts by mass of the rubber component being included; a filler (C) including silica, 20 parts by mass to 120 parts by mass of the filler (C) per 100 parts by mass of the rubber component being included; a vulcanization accelerator (D) as a combination of at least one selected from the group consisting of guanidines, sulfenamides, and thiazoles with diethyl thiourea; a silane coupling agent (E); and a vulcanizing agent (F), and the kneading comprises:
a kneading stage A for kneading the rubber component (A), the thermoplastic resin (B), the filler (C), diethyl thiourea of the vulcanization accelerator (D), and 2 parts by mass or more of the silane coupling agent (E) per 100 parts by mass of the rubber component, and
a kneading stage B, after the kneading stage A, for kneading at least one selected from the group consisting of guanidines, sulfenamides, and thiazoles of the vulcanization accelerator (D), and the vulcanizing agent (F) with a kneaded product prepared by the kneading in the kneading stage A.

2. The method of manufacturing a rubber composition of claim 1, wherein 5 mass % or more to less than 50 mass % of styrene-butadiene copolymer rubber is included in the rubber component (A).

3. The method of manufacturing a rubber composition of claim 1, wherein a content of the silica in the filler (C) is 50 mass % to 100 mass %.

4. The method of manufacturing a rubber composition of claim 3, wherein a content of the silica in the filler (C) is 90 mass % or more.

5. The method of manufacturing a rubber composition of claim 2, wherein a content of the silica in the filler (C) is 50 mass % to 100 mass %.

6. The method of manufacturing a rubber composition of claim 5, wherein a content of the silica in the filler (C) is 90 mass % or more.

* * * * *